United States Patent
Watts

[15] 3,680,630
[45] Aug. 1, 1972

[54] TEMPERATURE CONTROL SYSTEM WITH HEATER-COOLER

[72] Inventor: Paul J. Watts, Orem, Utah
[73] Assignee: Tronac, Incorporated, Orem, Utah
[22] Filed: Oct. 9, 1969
[21] Appl. No.: 865,113

[52] U.S. Cl. ............... 165/30, 165/64, 165/164, 165/180, 219/300, 219/301, 219/306
[51] Int. Cl. .................................. F25b 29/00
[58] Field of Search .......... 165/30, 64, 140, 141, 164; 219/236, 243, 298, 300, 301, 306; 138/33, 149, 137, 118; 174/15, 24

[56] References Cited

UNITED STATES PATENTS

| | | | |
|---|---|---|---|
| 2,139,888 | 12/1938 | Fausek et al. | 138/49 |
| 3,410,977 | 11/1968 | Ando | 219/300 X |
| 3,356,108 | 12/1967 | Johnston | 138/143 |
| 3,293,407 | 12/1966 | Ando | 219/301 |
| 3,507,324 | 4/1970 | Mueller | 165/164 |

*Primary Examiner*—Meyer Perlin
*Assistant Examiner*—Ronald C. Caposella
*Attorney*—Richards, Harris & Hubbard

[57] ABSTRACT

A temperature control system for use in constant temperature baths includes a combined heater-cooler. In one form the heater-cooler comprises a stainless steel tube having a silicone rubber tube mounted in it. Electric current is directed through the stainless steel tube to generate heat and cooling water is directed through the rubber tube. More precise control is achieved by mounting two rubber tubes in the stainless steel tube to provide counter-flow cooling. In another form, the heater-cooler comprises a heating wire having a rubber coating formed on it. The wire is positioned within a cooling water tube formed from thin metal.

7 Claims, 5 Drawing Figures

PATENTED AUG 1 1972

3,680,630

INVENTOR:
PAUL J. WATTS

Richards, Harris & Hubbard
ATTORNEY

3,680,630

TEMPERATURE CONTROL SYSTEM WITH HEATER-COOLER

BACKGROUND OF THE INVENTION

In the art of temperature control, it is frequently desirable to maintain very precise control over the temperature of a liquid bath. In the past, most constant temperature bath systems have included a resistance heater, a separate cooler, and a stirring mechanism. Typically, the coolant is maintained at a relatively constant temperature and the heater is electronically controlled in accordance with the temperature of the liquid.

During the operation of such a system, random fluctuations in the temperature of the liquid are frequently observed. It is theorized that the use of separate heating and cooling members contributes to these fluctuations. That is, even though the bath is stirred, it is believed that when the heater and the cooler of a bath are separate, portions of the bath are driven toward different temperatures and that this contributes to the temperature fluctuation in the bath.

The temperature fluctuations in a constant temperature bath system can be substantially reduced by combining the heating and cooling members of the system. Preferably, the heater is positioned inside the cooler, or vice versa. It has been found that the use of this technique reduces the amplitude of the temperature fluctuations in a constant temperature bath by an order of magnitude.

SUMMARY OF THE INVENTION

In accordance with the preferred embodiment, this invention comprises a temperature control system in which a cooling member is positioned within a heating member, or vice versa. Preferably, the heating and cooling members are thermally insulated one from the other.

DESCRIPTION OF THE DRAWING

A more complete understanding of the invention may be had by referring to the following detailed description when taken in conjunction with the drawing, wherein.

DETAILED DESCRIPTION

Figure 1:
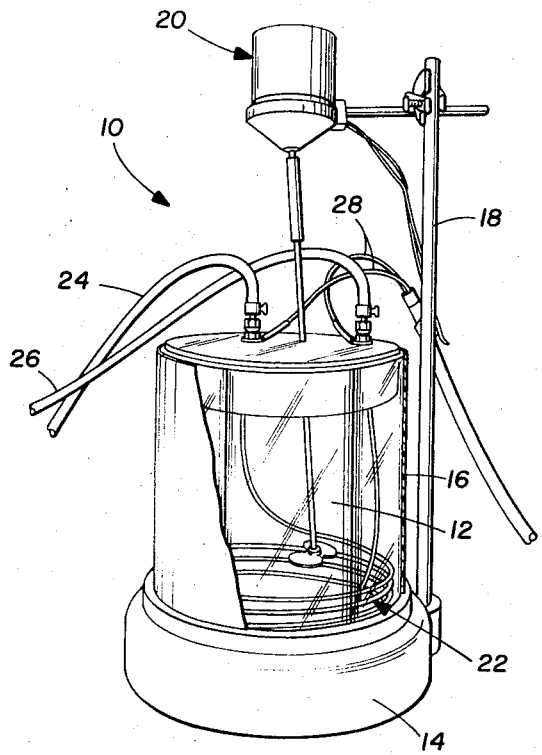
FIG. 1 is an illustration of a constant temperature bath employing the invention.

Referring now to the drawing, and particularly to FIG. 1, there is shown a constant temperature bath 10 employing the invention. The bath 10 includes a liquid receiving glass jar 12 that is supported on a base 14. The sides and the bottom of the jar 12 are covered by a layer of thermal insulation 16 which may be formed from plastic, fiberboard etc.

A column 18 extends upwardly from the base 14 and supports a stirring mechanism 20. The stirring mechanism 20 includes a motor that is secured to the column 18, a propeller positioned within the jar 12 and a shaft that extends between the motor and the propeller. It should be understood that the mechanism 20 is shown by way of example only and that any of the commercially available stirring mechanisms may be employed in the system 10.

The system 10 further includes a combined heater-cooler 22. The heater-cooler 22 is positioned within the jar 12 and operates to precisely control the temperature of the liquid therein. The heater-cooler shown in FIG. 1 is helical in shape and is positioned adjacent the bottom of the jar 12. It should be understood, however, that the heater-cooler may be of any desired shape and may be positioned at any location within the jar 12.

The heater-cooler 22 extends between a cooling fluid inlet tube 24 and a cooling fluid outlet tube 26. The heater-cooler 22 is also connected across a pair of electrical leads 28. In the preferred embodiment, the inlet 24 is connected to a source of tap water, the outlet 26 connected to a drain and leads 28 are connected to the output of an electronic temperature controller such as the controller manufactured by Tronac, Inc. and identified by that company as model number PTC-1000.

Figure 2:
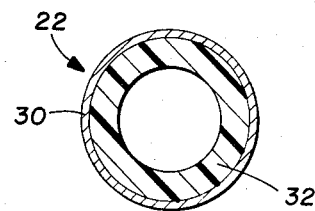
FIGS. 2, 3, 4, and 5 are cross-sectional views illustrating various embodiments of a heater-cooler employed in the system shown in FIG. 1.

Referring now to FIGS. 2, 3, 4, and 5, the details of the heater-cooler 22 are shown. A first embodiment of the heater-cooler 22 is shown in FIG. 2 and is comprised of an outer tube 30 having a predetermined electrical resistivity and an inner tube 32 formed from a thermal insulating material. In use, the ends of the tube 32 are connected to the inlet tube 24 and the outlet tube 26 and the ends of the tube 30 are connected to the leads 28. This causes water to flow through the tube 32 which tends to cool the liquid in the jar 12 and causes electric current to flow through the tube 30 which tends to heat the liquid. The electrical current flowing through the tube 30 is regulated by the electronic controller to control the temperature of the contents of the jar 12 in a very precise manner. Because the tube 30 is formed from an insulating material, the heater-cooler 22 provides excellent temperature control even though small, short term variations may occur in the temperature of the cooling water.

The heater-cooler 22 shown in FIG. 2 is preferably constructed by stretching the tube 32 to reduce its diameter, sliding the tube 30 over the tube 32 and then releasing the tube 32 so that it expands into engagement with the inside surface of the tube 30. The resulting structure may then be bent into a desired shape. By way of example, the tube 30 may be an annealed type 304 stainless steel tube having a wall thickness of 0.01 inches and having an outside diameter of 0.25 inches. The tube 32 may be standard silicone rubber tubing having a nominal outside diameter of 0.25 inches. A heater-cooler so constructed has a final inside diameter of approximately 0.1 inches.

Figure 3:
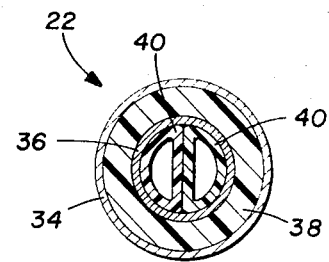

Referring now to FIG. 3, a second embodiment of the heater-cooler 22 is shown. The second embodiment includes an outer tube 34 formed from stainless steel. A tube 36 formed from copper and the like is positioned within the tube 34 and is separated therefrom by a tube 38 formed from silicone rubber. The tube 36 in turn encloses a pair of D-shaped tubes formed from a suitable plastic, such as polytetrafluoroethylene. The second embodiment of the invention operates similarly to the first embodiment except that the use of the tubes 40 permits counter-flow cooling and thereby provides more precise control over the temperature of the liquid in the jar 12. It will be apparent that counter-flow heating may be carried out with the embodiment of FIG. 3 installed in the system of FIG. 1 by connecting one of the two tubes 40 to line 24 and the other of tubes 40 to line 26. In this case, both lines 24 and 26 would attach to the system at the location, in FIG. 1, at which line 24 only is attached. At the point at which line 28 is attached in FIG. 1, the two tubes 40 would be connected together so that fluid would flow into the system through line 24 and pass through the length of the heater 22. It would then traverse the length of the heater 22 in the reverse direction and immerge through line 26.

Figure 4:
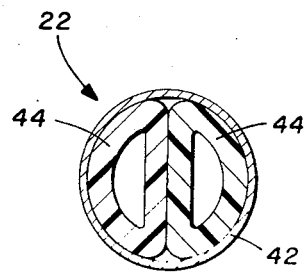

Referring now to FIG. 4, a third embodiment of the heater-cooler 22 is shown. The third embodiment includes an outer tube 42 formed from stainless steel and a pair of identical inner tubes 44 each formed from silicone rubber. The third embodiment is formed similarly to the first embodiment by stretching the tubes 44 and sliding the tube 42 over the tubes 44 while they are in the stretched condition. The third embodiment operates identically to the second embodiment in that the use of the two tubes 44 permits counter-flow cooling.

Figure 5:
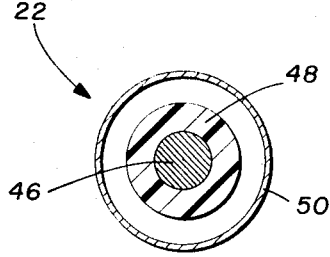

Referring now to FIG. 5, a fourth embodiment of the heater-cooler 22 is shown. The fourth embodiment includes an elongate body 46 formed from electrically resistive material, such as nickel-chromium alloy, a nickel-cadmium alloy, or stainless steel. The body 46 is surrounded by a layer of thermal insulation, such as silicone rubber or the like. The fourth embodiment further includes an outer tube 50 comprising a thin tube formed from a material having a high thermal conductivity, such as copper, aluminum, etc.

In the use of the fourth embodiment, the leads 28 of the system 10 are connected to opposite ends of the body 46 and the inlet and outlet tubes 24 and 26 are coupled to opposite ends of the tube 50. When the fourth embodiment of the heater-cooler 22 is employed, the flow of current through the body 46 is preferably maintained constant and the flow of water through the tube 50 is regulated by the electronic controller. This may be accomplished by coupling the output of the electronic controller to a servo-motor that in turn operates a valve positioned in the inlet tube 24 of the system 10.

The temperature control system according to the present invention is superior to prior systems principally because the heating and cooling elements of the system are combined in a single unit. For this reason, different portions of the contents of a constant temperature bath employing the system are not driven towards different temperatures. This substantially reduces temperature fluctuations in the contents of the bath. The system is also superior to prior systems in that it has a very short thermal time constant. This permits rapid recovery and very tight temperature control to be accomplished simultaneously. For these reasons, the system operates to provide very precise control over the temperature of a liquid bath or the like and does so without inducing random temperature fluctuations in the bath.

Although specific embodiments of the invention are illustrated in the drawing and desrcibed herein, it will be understood that the invention is not limited to the embodiments disclosed, but is capable of rearrangement, modification and substitution of parts and elements without departing from the spirit of the invention.

What is claimed is:

1. A temperature control system including:
   a. container means for confining a body of liquid to be controlled,
   b. flow means including an elongate tube extending through said container for contact with said liquid at the surface of said tube,
   c. electrical heating means extending the length of said tube for producing flow of heat to said liquid across said surface to increase the temperature of said liquid,
   d. means for directing flow coolant through said tube to lower the temperature of said liquid by heat flow across said surface from said liquid, and
   e. a temperature controller for control of the energization of said heating means for control of heat flow both to and from said liquid through the same said surface.

2. The temperature control system according to claim 1 wherein thermal insulation lines said tube.

3. The temperature control system according to claim 1 wherein structure forms a pair of fluid passageways for flow of said coolant in opposite directions.

4. The system according to claim 1 wherein the flow means includes a tubular passageway and wherein said heating means is positioned within the passageway.

5. The system according to claim 4 wherein said flow means includes a layer of insulating material encasing said heating means.

6. The system according to claim 4 wherein said flow means comprises two tubes for fluid flow in two directions along said heating means.

7. The system according to claim 1 wherein said flow means is a tube of electrical heater material.

* * * * *